(12) United States Patent
LeBlanc

(10) Patent No.: US 6,332,142 B1
(45) Date of Patent: Dec. 18, 2001

(54) MANAGEMENT INFORMATION BASE ATTRIBUTE DISCRIMINATOR

(75) Inventor: Michael Robert LeBlanc, Shirley, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/299,710

(22) Filed: Apr. 26, 1999

(51) Int. Cl.[7] ..................................................... G06F 17/30
(52) U.S. Cl. .............................. 707/100; 707/103; 707/10
(58) Field of Search ................................... 707/103, 100, 707/10; 709/221, 224, 217; 713/153

(56) References Cited

U.S. PATENT DOCUMENTS

| | | | | |
|---|---|---|---|---|
| 5,367,635 | * | 11/1994 | Bauer et al. | 709/221 |
| 5,864,865 | * | 1/1999 | Lakis | 707/103 |
| 6,085,237 | * | 7/2000 | Durham et al. | 709/221 |
| 6,108,782 | * | 8/2000 | Fletcher et al. | 713/153 |
| 6,122,664 | * | 9/2000 | Boukobza et al. | 709/224 |
| 6,170,005 | * | 1/2001 | Meandzija | 709/217 |

* cited by examiner

Primary Examiner—Sanjiv Shah
(74) Attorney, Agent, or Firm—McGlew and Tuttle, P.C.

(57) ABSTRACT

A management information base (MIB) attribute discriminator process is employed for organizing MIB attributes for system network management station (NMS) software. The NMS software monitors and configures network devices having a system object identifier. The devices have agents comprised of software running on an embedded device microprocessor wherein the parameters that an agent can control are described in a management information base (MIB). A MIB definition text file is provided with entries described by grammar and tokens. The MIB definition file is parsed with an information parser class. MIB data is then stored in memory, described by grammar and tokens. The MIB data is then accessed through a MIB definitions interface and using the MIB data with software of the NMS.

11 Claims, 3 Drawing Sheets

FIG.3

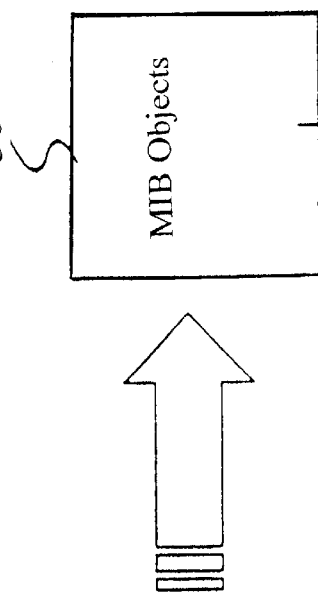

Mib Definitions.cfg — 52

Mib Definitions.cfg is a listing of the device/agent attributes organized by system OID and software revision. The syntax of this file is such that a deterministic parser can stream through the file and instanciate a memory object containing the MIB attributes.

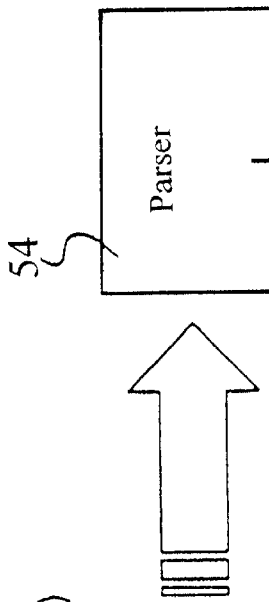

Parser — 54 — 50

The parser consist of a set of tokens and grammar defined by the developer. The tokens define certain known triggers expected as the Mib Definitions. cfg file is parsed. Tha grammar consists of tokens and other data which for this case are MIB attributes.

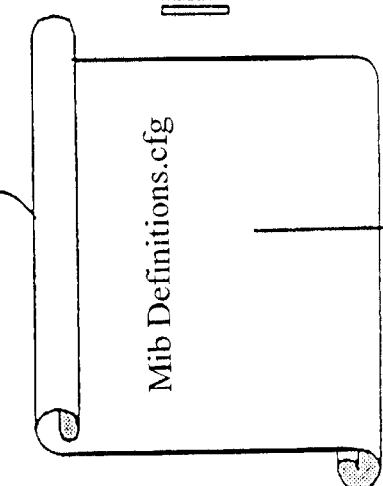

MIB Objects — 56

The out put of the parser consists of a set of objects contained within a class. The class provide methods to access the virous objects and retrieve information about the objects for further processing by the NMS

MANAGEMENT INFORMATION BASE ATTRIBUTE DISCRIMINATOR

FIELD OF THE INVENTION

The present invention relates to a computer language for monitoring and controlling devices of a computer network, in particular to a device description file and a separate management application.

BACKGROUND OF THE INVENTION

Network management applications are used to configure and monitor voice and data networking hardware. Typically, a network management station (NMS) communicates with an entity in the device referred to as an agent to obtain and configure various parameters. This agent is comprised of software that is running on an embedded device microprocessor (internal to the networking hardware). The NMS typically communicates with the agent using a transport mechanism such as the simple network management protocol (SNMP) to monitor and configure the attributes of the device.

The parameters that an agent can control are described in a management information base (MIB). Each entry in the MIB describes some attribute the agent can control, what the limitations there are for an attribute and how that attribute can be manipulated and accessed. As more functionality is added to the device over time, more support features are added to the agent and subsequently each of these attributes are typically added to the MIB.

As new functionality is added to the agent and the device, the functionality of the NMS must also be extended to include these new features. Typically, the developers of the NMS hardcode the parameters supported by a device. As more features and parameters are added to a device, the agent is extended and so to is the NMS software. A significant problem arises when an NMS must be developed to support all revisions of agent software for several customers. To support such a large contrast of devices and agent software revisions, the NMS must determine the agent type and software version and based upon that knowledge, the NMS typically uses complex hard coded logic to assess the application of various parameters. This creates a complex application that is difficult to debug, costly to maintain and not simply extended to support new devices or new features.

SUMMARY AND OBJECTS OF THE INVENTION

It is an object of the invention to avoid the problems with network systems wherein (management information base) MIB attributes are hard coded in the source code and the logic to handle the various agents and software revisions are very difficult to maintain.

It is a further object of the invention to provide a mechanism or system for network management software applications which avoids disadvantages involving high software maintenance, tedious software updates, lack of scalability and increased development time.

It is another object of the invention to provide a management information base (MIB) attribute discriminator (MAD) in the form of a software library developed to abstract MIB data from an application. The MAD provides a mechanism to describe MIB attributes in an external text file and organizes the MIB attributes by system object identifier (OED) and possibly agent software revision.

It is still another object of the invention to use the MAD essentially to eliminate the need to hardcode MIB information in an application and eliminate the need for an application to compile MIBs.

It is a further object of the invention to use the MAD to provide a simple programmatic interface to access MIB attributes and test whether they apply to a specific agent type and possibly agent software revision thus eliminating complex coding logic within the network management system (NMS).

According to the invention there is provided a computer network system with network devices with agents comprised of software running on an embedded device microprocessor. The parameters that an agent can control are described in a management information base (MIB). The network objects have a system object identifier (OID). A network management station (NMS) is provided with software for monitoring and configuring the network devices. A management information base (MIB) attribute discriminator is provided for organizing MIB attributes. The discriminator includes a MIB definition listing comprising a listing of device agent attributes organized by system OID. The MAD also includes a parser for parsing the MIB definitions and a MIB class stored in memory by the parser. The parser generates a set of MIB objects contained within the MIB class. A MIB definitions interface may be provided for accessing MIB data form the MIB class.

According to a further aspect of the invention a management information base (MIB) attribute discriminator process is employed for organizing MIB attributes for system network management station (NMS) software. The NMS software monitors and configures network devices having a system object identifier. The devices have agents comprised of software running on an embedded device microprocessor wherein the parameters that an agent can control are described in a management information base (MIB). A MIB definition text file is provided with entries described by grammar and tokens. The MIB definition file is parsed with an information parser class. MIB data is then stored in memory, described by grammar and tokens. The MIB data is then accessed through a MIB definitions interface and using the MIB data with software of the NMS.

The MIB attribute discriminator (MAD) provides a mechanism that abstracts the MIB data out of the application and provides a way to look up an attribute of interest and based upon the agent/device system object identifier (OID) and possibly the agent software revision. This mechanism can provide a yes or no answer if that feature is supported. If the feature is supported the NMS is provided with the appropriate information to control that feature. If a feature is not supported by a particular system and software revision then the NMS is informed appropriately.

The MAD was developed to provide a simple and extensible mechanism to organize MIB attributes according to the agent system OID and the agent software revision. The attributes are defined in a human readable text file that is parsed at startup. The entries in the text file are described by a grammar and tokens. The MAD can support various network manufacturer's equipment simply by making entries in a MibDefinitions.cfg file.

The entries in the MibDefinition.cfg file are described and defined by a grammar. The grammar is made up of tokens and attributes. The first token found may describe the type of file it is (i.e. the "MibDefinition" token). The second token, "Begin" and the last token "End" describe the beginning and end of the file. These are required so that the grammar parser can determine when to start and stop reading the device attributes.

Each main entry is preferably defined by the SysObjectID token followed by a quoted string value (i.e. ".1.3.6.1.4.1.43.1.9.13.3. I"). This quoted string value defines a particular system object identifier (OID). The OidDescr and OID pairs that follow define the attributes supported by a particular system OID (i.e. OidDescr "SystemConsoleAccess" OID ".1.3.6.1.4.1.114.1.4.1.18.0").

Further discrimination can be accomplished by extending the MAD to filter upon the software version. This step can be easily implemented and may be added into the MAD.

A further object of the invention is to provide a grammar that can describe the supported attributes of an agent and organize them by system OID.

A further object of the invention is to create a file that can describe the attributes of an agent wherein the file is easily extensible by simply adding new entries in order to provide new support for a new agent type or new agent features.

Still another object of the invention is to reduce software maintenance costs by describing static information in a runtime file wherein changes can be made to this file and the changes are immediately available without changing any source code.

According to a preferred embodiment of the invention, the system is implemented with functionality provided using the Java programing stored as a package (a package is the SUN Java equivalent of a software library) called "ConfigFileParser" within a source code control system (SCCS). The implementation utilizes the SUN "JJ" language syntax to describe the grammar and it uses the SUN Java Compiler Compiler (JavaCC) kit to generate the Java parsing source used to parse the description file. In addition, there are several Java sport classes that are used to facilitate the use of the device information.

It is still a further object of the present invention to provide a computer network management application where specific information for the network devices is not stored in the source code of the network application, but in a separate MIB Definition Language (MDL) file that can be separately created and read when the management application initially executes. The information in the MDL file is preferably static information of the network devices which cannot be directly polled from the network device over the network.

This further object is accomplished by creating a MDL file providing an abstraction of features of one of the devices of the computer network in a human readable text file. A management application source file is then created for monitoring and controlling the plurality of devices on the network. The management application source file is compiled into a management application executable file without reading information from the MDL file. Execution of the management application executable file includes parsing the MDL file to provide information from the MDL file to the management application. During execution, the management application also polls the one device according to polling features of the device as determined during the parsing of the MDL file.

The information in the MDL file can be abstracted such that many attributes can be described for many network devices. The text file can be parsed, read in by the management application at runtime and the information contained within this text file can be used by the management application at runtime. The grammar of the MDL file uses tokens and attributes to make it both readable to a human and to the management application.

The MDL file has a System Capabilities section describing the physical features of the network device, which include the sizing of the device and such information such as the number and type of filters, portgroups, slotgroups and address groups of the respective network device. The MDL file also includes a polling process definition section describing the polling processes supported by the respective network device. A literal string providing a name of the respective network device can also be included in the MDL Mle. A plurality of MDL files are provided with each of the plurality of MDL files describing one of the network devices. The network device that is hosting the management application preferably has the MDL file and the management application are encoded in memory devices of the network management device.

Each the network device operates using one of a plurality of versions of agent software, and the MDL file includes a plurality of divisions, with each of the divisions describing features of one of the versions of the agent software. The management application reads agent software version information from the network devices and uses features from a respective one of the divisions of the MDL file for monitoring and control of the respective network device.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a diagram showing a management information base (MIB) attribute discriminator according to the invention.

DESCRIPTION OF THE PREFERRED EMBODIMENT

Figure 1:
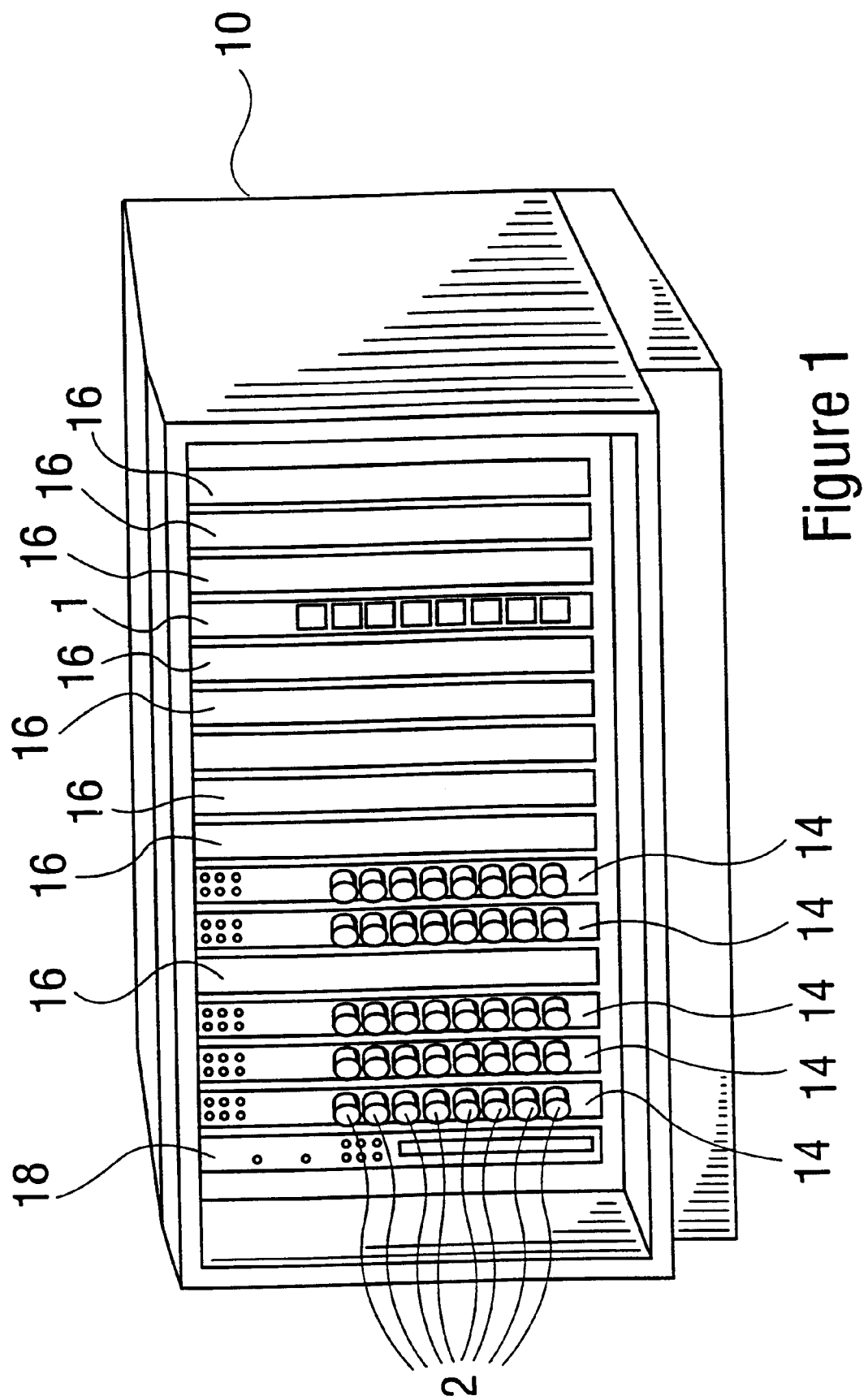
FIG. 1 is a perspective view of a concentrator containing several modules.
Figure 2:
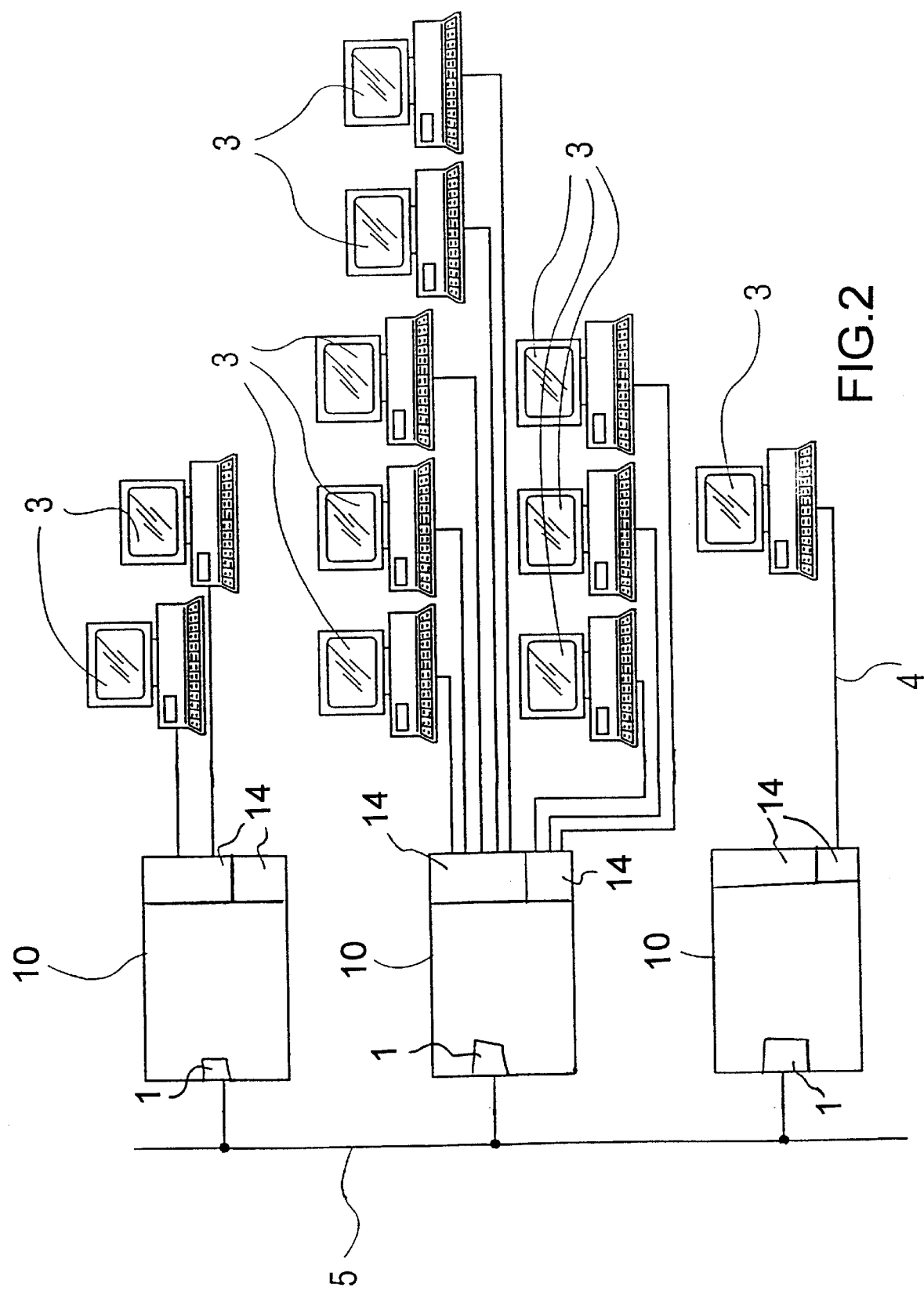
FIG. 2 is a schematic view of several work stations connected to modules of a concentrator.

Referring to the drawings in particular, FIG. 1 shows a network hub such as a concentrator 10 which supports a plurality of network devices such as media modules 14, bridge or router modules 1, network management modules, as well as concentrate power supply modules 18 and a plurality of empty slots 16 which can be filled with modules. Each of the media modules 14 has a plurality of ports 2. As shown in FIG. 2, a plurality of stations 3 can be connected over cables 4 (or by other means) to the ports 2 of media modules 14. The concentrator 10 can be connected to a plurality of other concentrators 10 to serve more users and to provide more than one Local Area Network (LAN). Two or more concentrators 10 can be connected through bridge or router modules 1. Depending on the media modules 14 and the router modules 1, the stations 3 can be combined to form any combination of LAN. In this way, the modules on several different concentrators can be connected to form a single bus network or users from different concentrators can be connected. The concentrators 10 are usually connected by a high bandwidth link 5. The media modules 14, the routers 1, and the concentrator management/power supply modules 18 can be provided with processors that can be configured by a network management application running on a station 3. All of these modules are network devices, and even such devices as network printers and modems can be considered network devices and controlled by a network management application.

The system of the invention provides a management information base (MIB) attribute discriminator 50 for organizing MIB attributes. The discriminator includes a MIB definition listing in the form of a MibDefinitions.cfg file 52. The MibDefinitions.cfg file 52 is a listing of the device/agent attributes organized by system and software revision. The syntax of this file is such that a deterministic parser can stream through the file and instanciate a memory object containing the MIB attributes. The MAD 50 includes a parser 54 based on a set of tokens and grammar defined by the developer (e.g. 3COM, etc.). The tokens define certain known triggers expected as the MibDefinitions.cfg file 52 parsed. The grammar has tokens and other data which for his case are the MIB attributes. MIB Objects 56 are the output of the parser 54. The MIB objects are a set of objects contained within a class. The class provides methods to access the various objects, test various objects and retrieve information about the objects for further processing by the NMS.

A computer network system is provided with the network devices with agents comprised of software running on an embedded device microprocessor. The parameters that an agent can control are described in a management information base (MIB). The network devices have a system object identifier (OID). Network management stations (NMSs) provided as the management functionality include software monitoring and configuring the network devices. The management information base (FB) attribute discriminator 50 forms part of the system and is used for organizing MIB attributes. The system forms the MibDefinitions.cfg file 52 is with the listing of the device/agent attributes organized by system and software revision. The system makes MIB object information available and this is used by the NMS.

The MIB attribute discriminator (MAD) provides a mechanism that abstracts the MIB data out of the application and provides a way to look up an attribute of interest and based upon the agent/device system object identifier (OID) and possibly the agent software revision, and can provide a yes or no answer if that feature is supported. If the feature is supported the NMS is provided with the appropriate information to control that feature. If a feature is not supported by a particular system and software revision then the NMS is informed appropriately.

The MAD was developed to provide a simple and extensible mechanism to organize MIB attributes according to the agent system OID and the agent software revision. The attributes are defined in a human readable text file that is parsed at startup. The entries in the text file are described by a grammar and tokens. The MAD can support 3Com devices and can easily be extended to support other network manufacturer's equipment simply by making entries in the MibDefinitions.cfg file such as the example as follows MibDefinitions Begin

```
{
SysObjectID Any
}
    // MIB-II definitions
    OidDescr    "sysDescr"                      OID               ".1.3.6.1.2.1.1.1.0"
    OidDescr    "sysObjectID"                   OID               ".1.3.6.1.2.1.1.2.011
    OidDescr    "sysUPTime"                     OID               ".1.3.6.1.2.1.1.3.0"
    OidDescr    "syscontact"                    OID               ".1.3.6.1.2.1.1.4.0"
    OidDescr    "sysname"                       OID               ".1.3.6.1.2.1.1.5.0"
    OidDescr    "syslocation"                   OID               ".1.3.6.1.2.1.1.6.011
    OidDescr    "sysservices"                   OID               ".1.3.6.1.2.1.1.7.01'
    OidDescr    "ifnumber"                      OID               ".1.3.6.1.2.1.2.1.0"
    OidDescr    "iftype"                        OID               ".1.3.6.1.2.1.2.2.1.3.0"
    OidDescr    "ifspeed"                       OID               ".1.3.6.1.2.1.2.2.1.5.Om
    OidDescr    "ifOperStatus"                  OID               ".1.3.6.1.2.1.2.2.1.8.0"
    OidDescr    "ifStackStatus"                 OID               ".1.3.6.1.2.1.31.1.2.1.3" // This is a table walk
    //Entity MIB definitions
    OidDescr    .'entPhysicalDescr"             OID               "1.3.6.1.2.1.47.1.1.1.1.2"
    OidDescr    entPhysicalVendorType"          OID               ".1.3.6.1.2.1.47.1.1.1.1.3"
    OidDescr    ..entPhysicalContainedln"       OID               ".1.3.6.1.2.1.47.1.1.1.1.4"
    OidDescr    ..entPhysicalClass"             OID               "1.3.6.1.2.1.47.1.1.1.1.5"
    OidDescr    "entPhysicalParentRelPos"       OID               ".1.3.6.1.2.1.47.1.1.1.1.6@'
    OidDescr    ..entPhysicalName"              OID               "1.3.6.1.2.1.47.1.1.1.1.7"
    OidDescr    entLogicaiDescr"                OID               "1.3.6.1.2.1.47.1.2.1.1.2"
    OidDescr    ..entLogicalType"               OID               "1.3.6.1.2.1.47.1.2.1.1.3"
    OidDescr    '.entLogicalCommunity"          OID               ".1.3.6.1.2.1.47.1.2.1.1.4"
    OidDescr    '.entLogicalTAddress"           OID               ".1.3.6.1.2.1.47.1.2.1.1.5"
    OidDescr    "entLogicalTDomain"             OID               ".1.3.6.1.2.1.47.1.2.1.1.6"
    OidDescr    ..entLPPhysicallndex"           OID               "1.3.6.1.2.1.47.1.3.1.1.1"
    OidDescr    "entAliasLogicallndexOrZero"    OID               "1.3.6.1.2.1.47.1.3.2.1.2"
    OidDescr    .'entAliasMappingidentifier"    OID               "1.3.6.1.2.1.47.1.3.2.1.2"
    OidDescr    entPhysicalChildindex"          OID               "1.3.6.1.2.1.47.1.3.3.1.1
    //swSys Trap definitions
    OidDescr    "swSysSystemOverTemperatureEvent"   OID                   1.3.6.1.4.1.114.1.4.1
    Description "Over Temperature Event"            Status "CRITICAL"    Color "red"
    OidDescr    "swSysPowerSupplyFailureEvent"      OID                   ".1.3.6.1.4.115.1.4.2"
    Description "Power Supply Event"                Status "CRITICAL"    Color "red"
    OidDescr    "swSysChassisSlotOverTemperatureEvent"  OID               ".1.3.6.1.4.1.114.1.4.3"
    Description "Slot Temperature Event"            Status "CRITICAL"    Color "red"
    OidDescr    "swSysChassiSlotInsertEvent"        OID                   1.3.6.1.4.1.114.1.4.4"
    Description "Slot Inserted Event"               Status "NORMAL"      Color "black"
```

-continued

| | | | | |
|---|---|---|---|---|
| OidDescr | "swSysChassisS[otExtractEvent" | OID | | ".1.3.6.1.4.1.114.1.4.5" |
| Description | "Slot Extracted Event" | Status | "NORMAL" | Color "black" |
| OidDescr | "swSysBridgeAddressThresholdEvent" | OID | | ".1.3.6.1.4.1.114.1.4.6" |
| Description | "Address Threshold Event" | Status | "WARNING" | Color "yellow" |
| OidDescr | "swSysSystemFanFailureEvent" | OID | | ".1.3.6.1.4.1.114.1.4.7" |
| Description | "Fan Failure Event" | Status | "MAJOR" | Color "red" |
| OidDescr | "swSysModuleCardSysOverTemperatureEvent" | OID | | ".1.3.6.1.4.1.114.1.4.8" |
| Description | "Card Temperature Event" | Status | "CRITICAL" | Color "red" |
| OidDescr | "swSysModuleCardinsertEvent" | OID | | ".1.3.6.1.4.1.114.1.4.9" |
| Description | "Card Insert Event" | Status | "NORMAL" | Color "black" |
| OidDescr | "swSysModuleCardExtractEvent" | OID | | ".1.3.6.1.4.1.114.1.4.10" |
| Description | "Card Extract Event" | Status | "NORMAL" | Color "black" |
| //CB9000 specific traps | | | | |
| OidDescr | "cb9000Hello" | OID | | ".1.3.6.1.4.1.43.28.2.1 |
| Description | "CB9000 Hello" | Status | "NORMAL" | Color "black" |
| OidDescr | "cb9000SiotDown" | OID | | ".1.3.6.1.4.1.43.28.2.2" |
| Description | "Slot Down" | Status | "CRITICAL" | Color "red" |
| OidDescr | "cb9000SlotUp" | OID | | ".1.3.6.1.4.1.43.28.2.3" |
| Description | "Slot Up" | Status | "NORMAL" | Color "black" |
| OidDescr | "cb9000Environment" | OID | | ".1.3.6.1.4.1.43.28.2.4" |
| Description | "Environmental Change" | Status | "WARNING" | Color "yellow" |
| OidDescr | "cb9000ModuleDown" | OID | | ".1.3.6.1.4.1.43.28.2.5" |
| Description | "Module Down" | Status | "CRITICAL" | Color |
| OidDescr | "cb9000ModuleUp" | OID | | ".1.3.6.1.4.1.43.28.2.6" |
| Description | "Module Up" | Status | "WARNING" | Color "yellow" |
| //FDDI traps | | | | |
| OidDescr | "a3ComFddiSMTHoldCondition" | OID | | ".1.3.6.1.4.1.43.29.10.1" |
| Description | "Hold Condition" | Status | "NORMAL" | Color "black" |
| OidDescr | "a3ComFddiSMTPeerWrapCondition" | OID | | ".1.3.6.1.4.1.43.29.10.2" |
| Description | "Peer Wrap Condition" | Status | "NORMAL" | Color "black" |
| OidDescr | "a3ComFddiMACDuplicateAddressCondition" | OID | | ".1.3.6.1.4.1.43.29.10.3" |
| Description | "MAC Duplicate Address" | Status | "NORMAL" | Color "black" |
| OidDescr | "a3ComFddiMACFrameErrorCondition" | OID | | ".1.3.6.1.4.1.43.29.10.4" |
| Description | "MAC Frame Error" | Status | "NORMAL" | Color "black" |
| OidDescr | "a3ComFddiMACNotCopiedCondition" | OID | | ".1.3.6-1.4.1.43.29.10.5" |
| Description | "MAC Not Copied" | Status | "NORMAL" | Color "black" |
| OidDescr | "a3ComFddiMACNeighborChangeEvent" | OID | | ".1.3.6.1.4.1.43.29.10.6" |
| Description | "MAC Neighbor Change" | Status | "NORMAL" | Color "black" |
| OidDescr | "a3ComFddiMACPathChangeEvent" | OID | | ".1.3.6-1.4.1.43.29.10.7" |
| Description | "MAC Path Change" | Status | "NORMAL" | Color "black" |
| OidDescr | "a3ComFddiPORTLerCondition" | OID | | ".1.3.6.1.4.1.43.29.10.8" |
| Description | "Port LER Condition" | Status | "NORMAL" | Color "black" |
| OidDescr | "a3ComFddiPORTUndesiredConnAftemptEvent" | OID | | ".1.3.6.1.4.1.43.29.10.9" |
| Description | "UndesiredConnectionAftemp" | status | "NORMAL" | Color "black" |
| OidDescr | "a3ComFddiPORTEBErrorCondition" | OID | | ".1.3.6.1.4.1.43.29.10.10" |
| Description | "Error Condition" | Status | "NORMAL" | Color "black" |
| OidDescr | "a3ComFddiPORTPathChangeEvent" | OID | | ".1.3.6.1.4.1.43.29.10.11" |
| Description | "Path Change" | Status | "NORMAL" | Color "black" |
| //3cPoll traps | | | | |
| OidDescr | "a3ComSysSystemOverTemperatureEvent" | OID | | ".1.3.6.1.4.1.43.29.4.1 |
| Description | "Over Temperature" | Status | HNORMAL" | Color "black" |
| OidDescr | "a3ComSysPowerSupplyFailureEvent" | OID | | ".1.3.6.1.4.1.43.29.4.2" |
| Desription | "Power Supply Failur" | Status | 'NORMAL" | Color "black" |
| OidDescr | "a3ComSysReservedTrap3" | OID | | ".1.3.6.1.4.1.43.29.4.3" |
| Description | "Reserved" | Status | "NORMAL" | Color "black" |
| OidDescr | "a3ComSysReservedTrap4" | OID | | ".1.3.6.1.4.1.43.29.4.4" |
| Description | "Reserved" | Status | "NORMAL" | Color "black" |
| OidDescr | "a3ComSysReservedTrap5" | OID | | ".1.3.6.1.4.1.43.29.4.5" |
| Description | "Reserved" | Status | "NORMAL' | Color "black" |
| OidDescr | "a3ComSysBridgeAddressThresholdEvent" | OID | | ".1.3.6.1.4.1.43.29.4.6" |
| Description | "Address Threshold" | Status | "NORMAL" | Color "black" |
| OidDescr | "a3ComSysSystemFanFailureEvent" | OID | | ".1.3.6.1.4.1.43.29.4.7" |
| Description | "Fan Failure" | Status | "NORMAL" | Color "black" |
| OidDescr | "a3ComSysModuleCardSysOverTemperatureEvent" | OID | | ".1.3.6.1.4.1.43.29.4.8" |
| Description | "Module Over Temperature" | Status | "NORMAL" | Color "black" |
| OidDescr | "a3ComSysModuleCardInsertEvent" | OID | | ".1.3.6.1.4.1.43.29.4.9" |
| Description | "Module Insert" | Status | "NORMAL" | Color "black" |
| OidDescr | "a3ComSysModuleCardExtractEvent" | OID | | ".1.3.6.1.4.1.43.29.4.10" |
| Description | "Modulue Extract" | Status | "NORMAL" | Color "black" |
| //bridge traps | | | | |
| OidDescr | "newroot" | OID | | ".1.3.6.1.2.1.17.1" |
| Description | "New Root" | Status | "NORMAL" | Color "black" |
| OidDescr | "topologychange" | OID | | ".1.3.6.1.2.1.17.2" |
| Description | "Topology Change" | Status | "NORMAL" | Color "black" |
| //lanplex traps | | | | |
| OidDescr | "IpSlotinsertEvent" | OID | | ".1.3.6.1.4.1.114.1.1.1" |
| Description | "Slot Insert" | Status | "NORMAL" | Color "black" |
| OidDescr | "IpSlotExtractEvent" | OID | | ".1.3.6.1.4.1.114.1.1.2" |
| Description | "Slot Extract" | Status | "NORMAL" | Color "black" |

-continued

| | | | |
|---|---|---|---|
| OidDescr | "IpBridgeAddressThresholdEvent" | OID | ".1.3.6.1.4.1.114.1.1.3" |
| Description | "Address Threshold" | Status "NORMAL" | Color 'black" |
| OidDescr | "IpSystemOverTemperatureEvent" | OID | ".1.3.6.1.4.1.114.1.1.4" |
| Description | "System OverTemperature" | Status "NORMAL" | Color "black" |
| OidDescr | "IpSlotOverTemperatureEvent" | OID | ".1.3.6.1.4.1.114.1.5" |
| Description | "Slot Over Temperature" | Status "NORMAL" | Color "black" |
| OidDescr | "IpPowerSupplyFailureEvent" | OID | ".1.3.6.1.4.1.114.1.1.6" |
| Description | "Power Supply Failure" | Status "NORMAL" | Color "black" |
| //rmon traps | | | |
| OidDescr | "risingalarm" | OID | ".1.3.6.1.2.1.16.1 |
| Description | "RMON Rising Alarm" | Status "NORMAL" | Color "black" |
| OidDescr | "fallingalarm" | OID | H.1.3.6.1.2.1.16.2" |
| Description | "RMON Falling Alarm" | Status "NORMAL" | Color "black" |
| //swFddi traps | | | |
| OidDescr | "swFddiSMTHoldCondition" | OID | ".1.3.6.1.4.1.114.1.10.1" |
| Description | "Hold Condition" | Status "NORMAL" | Color "black" |
| OidDescr | "swFddiSMTPeerWrapCondition" | OID | ".1.3.6.1.4.1.114.1.10.2" |
| Description | "Peer Wrap Condition" | Status "NORMAL" | Color "black" |
| OidDescr | "swFddiMACDuplicateAddressCondition" | OID | ".1.3.6.1.4.1.114.1.10.3" |
| Description | "Duplicate Address" | Status "NORMAL" | Color "black" |
| OidDescr | "swFddiMACFrameErrorCondition" | OID | ".1.3.6.1.4.1.114.1.10.4" |
| Description | "MAC Frame Error" | Status "NORMAL" | Color "black" |
| OidDescr | "swFddiMACNotCopiedCondition" | OID | ".1.3.6.1.4.1.114.1.10.5" |
| Description | "MAC Not Copied Error" | Status "NORMAL" | Color "black" |
| OidDescr | "swFddiMACNeighborChangeEvent" | OID | ".1.3.6.1.4.1.114.1.10.6" |
| Description | "MAC Neighbor Change" | Status "NORMAL" | Color "black" |
| OidDescr | "swFddiMACPathChangeEvent" | OID | ".1.3.6.1.4.1.114.1.10.7" |
| Description | "MAC Path Change Event" | Status "NORMAL" | Color "black" |
| OidDescr | "swFddiPORTLerCondition" | OID | ".1.3.6.1.4.1.114.1.10.8" |
| Description | "Port LER Condition" | Status "NORMAL" | Color "black" |
| OidDescr | "swFddiPORTUndesiredConnAftemptEvent' | OID | ".1.3.6.1.4.1.114.1.10.9" |
| Description | "Undesired Connection Aftemp" | Status "NORMAL" | Color "black" |
| OidDescr | ¢swFddiPORTEBErrorCondition" | OID | ".1.3.6.1.4.1.114.1.10.10" |
| Description | "Port Error Condition" | Status "NORMAL" | Color "black" |
| OidDescr | "swFddiPORTPathChangeEvent" | OID | ".1.3.6.1.4.1.114.1.10.11 |
| Description | "Path Change Event" | Status "NORMAL" | Color "black" |
| //Snmp traps | | | |
| OidDescr | "SNMP-Cold-Start" | OID | ".1.3.6.1.6.3.1.1.-5.1" |
| Description | "Cold Start" | Status "CRITICAL" | Color "red" |
| OidDescr | "SNMP-Warm-Start" | OID | ".1.3.6.1.6.3.1.1.5.2" |
| Description | "Warm Start" | Status "CRITICAL" | Color "red" |
| OidDescr | "SNMP-Link-Down" | OID | ".1.3.6.1.6.3.1.1.5.3" |
| Description | "Link Down" | Status "WARNING" | Color "yellow" |
| OidDescr | "SNMP-Link-Up" | OID | ".1.3.6.1.6.3.1.1.5.4" |
| Description | "Link UP" | Status "NORMAL" | Color "black" |
| OidDescr | "SNMP-Authen-Failure" | OID | ".1.3.6.1.6.3.1.1.5.5" |
| Description | "Authentication Failure" | Status "CRITICAL" | Color 'red" |
| OidDescr | "SNMP-EGP-Down" | OID | ".1.3.6.1.6.3.1-1.5.6" |
| Description | "EGP Down" | Status "CRITICAL" | Color "red" |

}
SysObjectID ".1.3.6.1.4.1.114.2.1.1.1.1.9"    CoreBuilder 3500 Rev. 1.1 (BA)
{

| | | | |
|---|---|---|---|
| OidDescr | "SystemSoftwareRevision" | OID | ".1.3.6.1.4.1.114.1.4.1.9.0" |
| OidDescr | "SystemSnmpRevision" | OID | ".1.3.6.1.4.1.114.1.4.1.11.Om |
| OidDescr | "SystemCurrentSnmpMode" | OID | ".1.3.6.1.4.1.114.1.4.1.13.0" |
| OidDescr | "SystemConsoleAccess" | OID | ".1.3.6.1.4.1.114.1.4.1.18.0" |
| OidDescr | "SystemConsoleReadPwd" | OID | ".1.3.6.1.4.1.114.1.4.1.19.0" |
| OidDescr | "SystemConsoleWritePwd" | OID | ".1.3.6.1.4.1.114.1.4.1.20.0" |
| OidDescr | "SystemConsoleAdminPwd" | OID | ".1.3.6.1.4.1.114.1.4.1.21.0" |
| OidDescr | "SystemDateTime" | OID | ".1.3.6.1.4.1.114.1.4.1.22.0" |
| OidDescr | "SmtCount" | OID | ".1.3.6.1.4.1.114.1.4.9.1.0' |
| OidDescr | "SlotCount" | OID | ".1.3.6.1.4.1.114.1.4.2.1.0" |
| OidDescr | "SlotBoardType" | OID | ".1.3.6.1.4.1.114.1.4.2.2.1.2.0" |
| OidDescr | "SlotBoardRevision" | OID | ".1.3.6.1.4.1.114.1.4.2.2.1.3-0" |
| OidDescr | "SlotBoardStatus" | OID | ".1.3.6.1.4.1.114.1.4.2.2.1.4.0" |
| OidDescr | "SlotBoardName" | OID | ".1.3.6.1.4.1.114.1.4.2.2.1.5.0" |
| OidDescr | "SlatEthernetPortCount" | OID | 1.3.6.1.4.1.114.1.5.2.2.1.7.0" |
| OidDescr | "SlotFddiMacCount" | OID | 1.3.6.1.4.1.114.1.4.2.2.1.8-0" |
| OidDescr | "SlotFddiPortCount" | OID | ".1.3.6.1.4.1.114.1.4.2.2.1.9.0" |
| OidDescr | "SnmpAgentId" | OID | ".1.3.6.1.4.1.114.1.4.5.1.0" |
| OidDescr | "SnmpProxylnternalRequests" | OID | ".1.3.6.1.4.1.114.1.4.5.4.0" |
| OidDescr | "SnmplnternalProxyAgentid" | OID | ".1.3.6.1.4.1.114.1.4.5.7.1.1.0" |
| OidDescr | "SnmpinternalProxyAccessClass" | OID | ".1.3.6.1.4.1.114.1.4.5.7.1.2.0" |
| OidDescr | "SnmpinternalProxyCommunity" | OID | ".1.3.6.1.4.1.114.1.4.5.7.1.3.0" |
| OidDescr | "InterfaceLocation1findex" | OID | ".1.3.6.1.4.1.114.1.4.7.1.1.1" |
| OidDescr | "InterfaceLocationlnterfaceType' | OID | ".1.3.6.1.4.1.114.1.4.7.1.1.2" |
| OidDescr | "InterfaceLocationType" | OID | ".1.3.6.1.4.1.114.1.4.7.1.1.3" |
| OidDescr | "InterfaceLocationTypeindex" | OID | ".1.3.6.1.4.1.114.1.4.7.1.1.4" |
| OidDescr | "InterfaceLocationLocalIndex" | OID | ".1.3.6.1.4.1.114.1.4.7.1.1.5" |

-continued

| | | | |
|---|---|---|---|
| OidDescr | "InterfaceLocationSystemModuleIndex" | OID | ".1.3.6.1.4.1.114.1.4.7.1.1.6" |

// dot1 Bridge Information

| | | | |
|---|---|---|---|
| OidDescr | "dotldStpPriority" | OID | ".1.3.6.1.2.1.17.2.2.0" |
| OidDescr | "dot1 dStpBridgeMaxAge" | OID | ".1.3.6.1.2.1.17.2.12.0" |
| OidDescr | "dot1 dStpBridgeHelloTime" | OID | ".1.3.6.1.2.1.17.2.13.0" |
| OidDescr | "dot1 dStpBridgeForwardDelay' | OID | ".1.3.6.1.2.1.17.2.14.0" |
| OidDescr | "dot1 dTpAgingTime" | OID | ".1.3.6.1.2.1.17.4.2.0" |

//BridgeTable

| | | | |
|---|---|---|---|
| OidDescr | "BridgeCount" | OID | ".1.3.6.1.4.1.114.1.4.10.1.0" |
| OidDescr | "BridgeIndex" | OID | H.1.3.6.1.4.1.114.1.4.10.2.1.1 |
| OidDescr | "BridgePortCount" | OID | ".1.3.6.1.5.1.114.1.4.10.2.1.2" |
| OidDescr | "BridgeAddressThreshold" | OID | ".1.3.6.1.4.1.114.1.4.10.2.1.6" |
| OidDescr | "BridgeIpFragmentationEnabled" | OID | ".1.3.6.1.4.1.114.1.4.10.2.1.9" |
| OidDescr | "BridgeSTPGroupAddress" | OID | ".1.3.6.1.4.1.114.1.4.10.2.1.1.1" |
| OidDescr | "BridgeSTPEnable" | OID | ".1.3.6.1.4.1.114.1.4.10.2.1.12" |
| OidDescr | "BridgeIpxSnapTranslationEnable" | OID | ".1.3.6.1.4.1.114.1.4.10.2.1.13" |

//BridgePortTable

| | | | |
|---|---|---|---|
| OidDescr | "BridgePortBridgeIndex" | OID | ".1.3.6.1.4.1.114.1.4.10.3.1.1" |
| OidDescr | "BridgePortIndex" | OID | ".1.3.6.1.4.1.114.1.4.10.3.1.2" |
| OidDescr | "BridgePortIf Index" | OID | ".1.3.6.1.4.1.114.1.4.10.3.1.3" |

//VLAN Information

| | | | |
|---|---|---|---|
| OidDescr | "Vlan1fDescr" | OID | ".1.3.6.1.4.1.43.10.1.14.1.2.1.2" //Table walk; String |
| OidDescr | "VlanifType" | OID | ".1.3.6.1.4.1.43.10.1.14.1.2.1.3" //Table walk; Integer |
| OidDescr | "Vlan1fGlobalidentifier" | OID | ".1.3.6.1.4.1.43.10.1.14.1.2.1.4" // Table walk; Integer |
| OidDescr | "Vlan1fInfo" | OID | ".1.3.6.1.4.1.43.10.1.14.1.2.1.5" //Table walk; Integer |
| OidDescr | "VlanIfStatus" | OID | ".1.3.6.1.4.1.43.10.1.14.1.2.1.6" //Table walk; Integer |
| OidDescr | "Vlan1fModeType" | OID | ".1.3.6.1.4.1.43.10.1.14.1.2.1.7" // Table walk; Integer |
| OidDescr | "IpVlanIpNetAddress" | OID | ".1.3.6.1.4.1.43.10.1.14.2.1.1.1 //IPAddress |
| OidDescr | "IpVlan1pNetMask" | OID | ".1.3.6.1.4.1.43.10.1.14.2.1.1.2" |

//IP Address

| | | | |
|---|---|---|---|
| OidDescr | "IpVlanStatus" | OID | ".1.3.6.1.4.1.43.10-1.14.2.1.1.3" |

//RowStatus

| | | | |
|---|---|---|---|
| OidDescr | "VlanProtocolStatus" | OID | 1.3.6.1.4.1.43.10.1.14.2.2.1.3" //RowStatus |

//EthernetPortTable

| | | | |
|---|---|---|---|
| OidDescr | "EthernetPortCount" | OID | ",1.3.6.1.4.1.114.1.4.8.1.0" |
| OidDescr | "EthernetPortIndex" | OID | ".1.3.6.1.4.1.114.1.4.8.2.1.1" |

//Table (int)

| | | | |
|---|---|---|---|
| OidDescr | "EthernetPortifindex" | OID | ".1.3.6.1.4.1.114.1.4.8.2.1.2" // Table (int) |
| OidDescr | "EthernetPortLabelH" | OID | ".1.3.6.1.4.1.114.1.4.8.2.1.3" |

//Table (String)

| | | | |
|---|---|---|---|
| OidDescr | "EthernetPortLinkStatus" | OID | ".1.3.6.1.4.1.114.1.4.8.2.1.4" //Table (int) |
| OidDescr | "EthernetPortType" | OID | 1.3.6.1.4.1.114.1.4.8.2.1.5" //Table (int) |

//SmtFddiPortTable

| | | | |
|---|---|---|---|
| OidDescr | "SmtFddiPortSmtindex" | OID | ".1.3.6.1.4.1.114.1.4.9.6.1.1.0" |
| OidDescr | "SmtFddiPortLocationTypeindex" | OID | 1.3.6.1.4.1.114.1.4.9.6.1.4.0" |
| OidDescr | "SmtFddiPortLabel" | OID | ".1.3.6.1.4.1.114.1.4.9.6.1.6.0" |

//Web parameters were not specified in this software version (but these may be specified)

//SNMP parameters

| | | | |
|---|---|---|---|
| OidDescr | "SysAgentReadCommunity" | OID | ".1.3.6.1.4.1.114.1.4.6.7.0" |
| OidDescr | "SysAgentReadWriteCommunity" | OID | ".1.3.6.1.4.1.114.1.4.6.8.0" |

//Trap parameters

| | | | |
|---|---|---|---|
| OidDescr | "SysAgentTrapDestinationTrapMask" | OID | 1.3.6.1.4.1.114.1.4.6.6.1.3" |

}
SysObjectID
{
```
1.3.6.1.4.1.43.1.16.1.1.1.1        CoreBuilder 3500 Rev. 1.2+ (BA)
1.3.6.1.4.1.43.1.16.1.2.1.1 "      // CoreBuilder 9400 24 Port (GA)
1.3.6.1.4.1.43.1.16.2.2.1.1 "      // SuperStack 3900 24 Port (CA)
1.3.6.1.4.1.43.1.16.2.2.1.2"       // SuperStack 3900 36 Port (CA)
1.3.6.1.4.1.43.1.16.2.2.2.1        // SuperStack 9300 12 Port (GA)
```
}
{

// System level parameters

| | | | |
|---|---|---|---|
| OidDescr | "Systemid" | OID | 1.3.6.1.4.1.43.29.4.1.1.0" |
| OidDescr | "SystemType" | OID | ".1.3.6.1.4.1.43.29.4.1.2.0" |
| OidDescr | "SystemName" | OID | ".1.3.6.1.4.1.43.29.4.1.3.0" |
| OidDescr | "SystemManufacturer" | OID | ".1.3.6.1.4.1.43.29.4.1.4.0" |
| OidDescr | "SystemHardwareRevision" | OID | ".1.3.6.1.4.1.43.29.4.1.5.0" |
| OidDescr | "SystemMemorySize" | OID | ".1.3.6.1.4.1.43.29.4.1.6.0" |
| OidDescr | "SystemFlashMemorySize" | OID | ".1.3.6.1.4.1.43.29.4.1.7.0" |
| OidDescr | "SystemNvMemorySize" | OID | ".1.3.6.1.4.1.43.29.4.1.8.0" |
| OidDescr | "SystemSoftwareRevision" | OID | ".1.3.6.1.4.1.43.29.4.1.9.0" |
| OidDescr | "SystemBuildTime" | OID | ".1.3.6.1.4.1.43.29.4.1.10.0" |
| OidDescr | "SystemSnmpRevision" | OID | ".1.3.6.1.4.1.43.29.4.1.11.0" |
| OidDescr | "SystemRequestedSnmpMode" | OID | ".1.3.6.1.4.1.43.29.4.1.12.0" |
| OidDescr | "SystemCurrentSnmpMode" | OID | ".1.3.6.1.4.1.43.29.4.1.13.0" |
| OidDescr | "SystemAction" | OID | ".1.3.6.1.4.1.43.29.4'.1.14.0" |

-continued

| | | | |
|---|---|---|---|
| OidDescr | "SystemOvertemperature" | OID | ".1.3.6.1.4.1.43.29.4.1.15.0" |
| OidDescr | "SystemFanFailure" | OID | ".1.3.6.1.4.1.43.29.4.1.16.0" |
| OidDescr | "SystemProtocolMask" | OID | ".1.3.6.1.4.1.43.29.4.1.17.0" |
| OidDescr | "SystemConsoleAccess" | OID | ".1.3.6.1.4.1.43.29.4.1.18.0" |
| OidDescr | "SystemConsoleReadPwd" | OID | ".1.3.6.1.4.1.43.29.4.1.19.0" |
| OidDescr | "SystemConsoleWritePwd" | OID | ".1.3.6.1.4.1.43.29.4.1.20.0" |
| OidDescr | "SystemConsoleAdminPwd" | OID | ".1.3.6.1.4.1.43.29.4.1.21.0" |
| OidDescr | "SystemDateTime" | OID | ".1.3.6.1.4.1.43.29.4.1.22.0" |
| OidDescr | "SystemDSTime" | OID | ".1.3.6.1.4.1.43.29.4.1.23.0" |
| OidDescr | "SystemTimeZone" | OID | ".1.3.6.1.4.1.43.29.4.1.24.0" |
| OidDescr | "SystemCurrentFddiStationMode" | OID | ".1.3.6.1.4.1.43.29.4.1.25.0" |
| OidDescr | "SystemRequestedFddiStationMode" | OID | ".1.3.6.1.4.1.43.29.4.1.26.0" |
| OidDescr | "SystemBaseMACAddress" | OID | ".1.3.6.1.4.1.43.29.4.1.28.0" |
| OidDescr | "SystemMACAddressCount" | OID | ".1.3.6.1.4.1.43.29.4.1.29.0" |
| OidDescr | "SystemChassisSerialNumber" | OID | ".1.3.6.1.4.1.43.29.4.1.30.0" |
| OidDescr | "SystemFPMemorySize" | OID | ".1.3.6.1.4.1.43.29.4.1.31.0" |
| OidDescr | "SystemBufferSize" | OID | ".1.3.6.1.4.1.43.29.4.1.32.0" |
| OidDescr | "SmtCount" | OID | ".1.3.6.1.4.1.43.29.4.9.1.0" |
| OidDescr | "SlotCount" | OID | ".1.3.6.1.4.1.43.29.4.2.1.0" |
| OidDescr | "SlotBoardType" | OID | ".1.3.6.1.4.1.43.29.4.2.2.1.2.0" |
| OidDescr | "SlotBoardRevision" | OID | ".1.3.6.1.4.1.43.29.4.2.2.1.3.0" |
| OidDescr | "SlotBoardStatus" | OID | ".1.3.6.1.4.1.43.29.4.2.2.1.4.0" |
| OidDescr | "SlotBoardName" | OID | ".1.3.6.1.4.1.43.29.4.2.2.1.5.0" |
| OidDescr | "SlotEthernetPortCount" | OID | ".1.3.6.1.4.1.43.29.4.2.2.1.7.0" |
| OidDescr | "SlotFddiMacCount" | OID | ".1.3.6.1.4.1.43.29.4.2.2.1.8.0" |
| OidDescr | "SlotFddiPortCount" | OID | ".1.3.6.1.4.1.43.29.4.2.2.1.9.0" |
| OidDescr | "SnmpAgentId" | OID | ".1.3.6.1.4.1.43.29.4.5.1.0" |
| OidDescr | "SnmpProxyInternalRequests" | OID | ".1.3.6.1.4.1.43.29.4.5.4.0" |
| OidDescr | "SnmpInternalProxyAgentId" | OID | ".1.3.6.1.4.1.43.29.4.5.7.1.1.0" |
| OidDescr | "SnmpInternalProxyAccessClass" | OID | ".1.3.6.1.4.1.43.29.4.5.7.1.2.0" |
| OidDescr | "SnmpinternalProxyCommunity" | OID | ".1.3.6.1.4.1.43.29.4.5.7.1.3.0" |
| OidDescr | "InterfaceLocationifindex" | OID | '.1.3.6.1.4.1.43.29.4.7.1.1.1 |
| OidDescr | "InterfaceLocationInterfaceType" | OID | ".1.3.6.1.4.1.43.29.4.7.1.1.2" |
| OidDescr | "InterfaceLocationType" | OID | ".1.3.6.1.4.1.43.29.4.7.1.1.3" |
| OidDescr | "InterfaceLocationTypeIndex" | OID | ".1.3.6.1.4.1.43.29.4.7.1.1.4" |
| OidDescr | "InterfaceLocationLocalIndex" | OID | ".1.3.6.1.4.1.43.29.4.7.1.1.5" |
| OidDescr | "InterfaceLocationSystemModuleIndex" | OID | ".1.3.6.1.4.1.43.29.4.7.1.1.6" |
| //dot1Bridge Information | | | |
| OidDescr | "dot1dStpPriority" | OID | ".1.3.6.1.2.1.17.2.2.0" |
| OidDescr | "dot1 dStpBridgeMaxAge" | OID | ".1.3.6.1.2.1.17.2.12.0" |
| OidDescr | "dot1 dStpBridgeHelloTime" | OID | ".1.3.5.1.2.1.17.2.13.0" |
| OidDescr | "dot1dStpBridgeForwardDelay" | OID | ".1.3.6.1.2.1.17.2.14.0" |
| OidDescr | "dot1 dTpAgingTime" | OID | ".1.3.6.1.2.1.17.4.2.0" |
| //BridgeTable | | | |
| OidDescr | "BridgeCount" | OID | ".1.3.6.1.4.1.43.29.4.10.1.0" |
| OidDescr | "BridgeIndex" | OID | ".1.3.6.1.4.1.43.29.4.10.2.1.1" |
| OidDescr | "BridgePortCount" | OID | ".1.3.6.1.4.1.43.29.4.10.2.1.2" |
| OidDescr | "BridgePortif Index" | OID | 1.3.6.1.4.1.43.29.4.10.3.1.3" |
| // VLAN Information | | | |
| OidDescr | "VianIfDescr" | OID | ".1.3.6.1.4.1.43.10.1.14.1.2.1.2" // Table walk; String |
| OidDescr | "VianifType" | OID | ".1.3.6.1.4.1.43.10.1.14.1.2.1.3" // Table walk; Integer |
| OidDescr | "VianIfGlobalidentifier" | OID | 1.3.6.1.4.1.43.10.1.14.1.2.1.4" // Table walk; Integer |
| OidDescr | "Vlanifinfo" | OID | ".1.3.6.1.4.1.43.10.1.14.1.2.1.5" //Table walk; Integer |
| OidDescr | "VlanifStatus" | OID | ".1.3.6.1.4.1.43.10.1.14.1.2.1.6"//Table walk; Integer |
| OidDescr | "VlanIfModeType" | OID | ".1.3.6.1.4.1.43.10.1.14.1.2.1.7" // Table walk; Integer |
| OidDescr | "IpVlan[pNetAddress" | OID | ".1.3.6.1.4.1.43.10.1.14.2.1.1.1 |
| // Table walk; IP Address | | | |
| OidDescr | "IpVlanIpNetMask" | OID | ".1.3.6.1.4.1.43.10.1.14.2.1.1.2" |
| //Table walk; IP Address | | | |
| // EthernetPortTable | | | |
| OidDescr | "EthernetPortCount" | OID | 1.3.6.1.4.1.43.29.4.8.1.0" |
| OidDescr | "EthernetPortIndex" | OID | 1.3.6.1.4.1.43.29.4.8.2.1.1 |
| // Table (int) | | | |
| OidDescr | "EthernetPortIfIndex" | OID | ".1.3.6.1.4.1.43.29.4.8.2.1.2" //Table (int) |
| OidDescr | "EthernetPortLabel" | OID | ".1.3.6.1.4.1.43.29.4.8.2.1.3" |
| //Table (String) | | | |
| OidDescr | "EthernetPortLabel" | OID | ".1.3.6.1.4.1.43.29.4.8.2.1.3" |
| //Table (String) | | | |
| OidDescr | "EthernetPortLinkStatus" | OID | ".1.3.6.1.4.1.43.29.4.8.2.1.4" |
| // Table (int) | | | |
| OidDescr | "EthernetPortType" | OID | ".1.3.6.1.4.1.43.29.4.8.2.1.5" |
| Table (int) | | | |
| //SmtFddiPortTable | | | |
| OidDescr | "SmtFddiPortSmtIndex" | OID | ".1.3.6.1.4.1.43.29.4.9.6.1.1.0" |
| OidDescr | "SmtFddiPortLocaitonTypeIndex" | OID | ".1.3.6.1.4.1.43.29.4.9.6.1.4.0" |
| OidDescr | "SmtFddiPortLabel" | OID | ".1.3.6.1.4.1.43.29.4.9.6.1.6.0" |
| //Web parameters | | | |
| OidDescr | "WebConfigHelpServer" | OID | "-1.3.6.1.4.1.43.29.4.24.1.0" |

-continued

```
    // SNMP parameters
    OidDescr    "SysAgentReadCommunity"                      OID    1.3.6.1.4.1.43.29.4.6.7.0"
    OidDescr    "SysAgentReadWriteCommunity"                 OID    ".1.3.6.1.4.1.43.29.4.6.8.0"
    //Trap parameters
    OidDescr    "SysAgentTrapDestinationTrapMask"            OID    ".1.3.6.1.4.1.43.29.4.6.6.1.3"
    // Ethernet HTTP access parameters
    OidDescr    "EthernetHftpAccessUrl"                      OID    "ethernetlethernetHftpAccess.html"
    OidDescr    "EthernetPortLabelHttpAccess"                OID    'label"
    OidDescr    "EthernetPortStateHttpAccess"                OID    "state"
    OidDescr    "EthernetPortAutonegotiationHftpAccess"      OID    "autonegotiation"
    // System HTTP access parameters
    OidDescr    "SystemHttpAccessURL"                        OID    "system/systemHftpAccess.html"
    OidDescr    "SystemWebAccessModeHttpAccess"              OID    "webaccess"
}
SysObjecti D ".1.3.6.1.4.1.43.1.9.13.3.1" //Eclipse chassis
{
    HOidDescr   "SystemConsoleReadPwd"                       OID    ".1.3.6.1.4.1.43.29.4.1.19.0"
    //OidDescr  "SystemConsoleWritePwd"                      OID    ".1.3.6.1.4.1.43.29.4.1.20.0"
    //OidDescr  "SystemConsoleAdminPwd"                      OID    ".1.3.6.1.4.1.43.29.4.1.21.0"
    //OidDescr  "SystemConsoleAccess"                        OID    ".1.3.6.1.4.1.43.29.4.1.18.0"
    //OidDescr  "SystemDateTime"                             OID    ".1.3.6.1.4.1.43.29.4.1.22.0"
    // Web parameters
    //OidDescr  "WebConfigHelpServer"                        OID    1.3.6.1.4.143.29.4.24.1.0"
    // SNMP parameters
    //OidDescr  'SysAgentReadCommunity"                      OID    1.3.6.1.4.1.43.29.4.6.7.0"
    //OidDescr  "SysAgentReadWriteCommunity"                 OID    1.3.6.1.4.1.43.29.4.6.8.0"
    //Trap parameters
    //OidDescr  "SysAgentTrapDestinationTrapMask"            OID    ".1.3.6.1.4.1.43.29.4.6.6.1.3"
    }
}
End
```

The entries in the MibDefinition.cfg file are described and defined by a grammar. The grammar is made up of tokens and attributes. The first token found in the above definitions file example describes the type of file it is (i.e. the "Mib-Definition" token). The second token, "Begin" and the last token "End" describe the beginning and end of the file. These are required so that the grammar parser can determine when to start and stop reading the device attributes.

Each main entry is defined by the SysObjectID token followed by a quoted string value (i.e. ".1.3.6.1.4.1.43.1.9.13.3. I"). This quoted string value defines a particular system object identifier (OID). The OidDescr and OID pairs that follow define the attributes supported by a particular system OID (i.e. OidDescr "SystemConsoleAccess" OID ".1.3.6.1.4.1.114.1.4.1.18.0").

In the example, the MIB definition listing includes system object identification information, network entity identification information, software system trap (i.e. the location at which control is transferred in the case of an interrupt as soon as the current instruction is complete) definitions, specific system traps, specific device traps, simple network management protocol (SNMP) traps, virtual LAN information, bridge tables information, Bridge port information, Ethernet pot table information, web parameters, SNMP parameters, stap parameters, System level parameter information is also provided. Further discrimination can be accomplished by extending the MAD to filter upon the software version. This step can be easily implemented and may be added into the MAD.

The system provides the following:
1. A grammar that can describe the supported attributes of an agent and organize them by system OID.
2. A file that can describe the attributes of an agent wherein the file is easily extensible by simply adding new entries in order to provide new support for a new agent type or new agent features.
3. A reduction software maintenance costs by describing static information in a runtime file. Changes can be made to this file and the changes are immediately available without changing any source code.

The implementation of this functionality is done using the Java programming language and is stored as a package (a package is the SUN Java equivalent of a software library) called "ConfigFileParser" within a source code control system (SCCS). The implementation utilizes the SUN "JJ" language syntax to describe the grammar and it uses the SUN Java Compiler Compiler (JavaCC) kit to generate the Java parsing source used to parsed the description file. In addition, there are several Java support classes that are used to facilitate the use of the device information.

To use the device description feature, one would do the following:

Step 1. Parse the device description file by calling the following line of code from the "ConfigFileParser" package ConfigFileParser deviceInfoparser=new ConfigFileParser ("MibDefinition.cfg");

The ConfigFileParser class is responsible for many tasks. One of those tasks is to parse the MIB definition file. As it parses this file, the MIB data is stored in memory and this data is readily accessible through the a simple MibDefinitions interface. One must merely pass in an optional system OID and a string representation of the attribute desired as arguments and the software library will lookup to see if that attribute applies to the system in question.

For example, to look up an attribute based upon system OID filtering and an attribute name, one would implement the following code:
// Get a handle to the MibDefinition data.
MibDefinition mibdefs=MibDefinition.Instanceo;
// Search the MibDefinitions file for an entry that matches.
mibDefinitionEntry mibentry=mibdefs.getMibEntry (sysOID, attrname, MibDefnition.BY-OID-NAME
//If we don't find an entry it most probably means that the device with this OID doesn't support //the functionality.
String oidstring=null;

```
if ((mibentry !=nul.1)
{
        oidstring   mibentry.getOid();
}
        An example of the MIB definitions class is as follows:
        MibDefinitions class file
package com.coms.S2.ConfigFileParser;
import java.util..*;
/**
*       This class provides a Singleton capability
*       for the MibDefinition. Only one (1) of
*       these classes should ever be instantiated.
* NOTE: Do not subvert this mechanisim!!
*/
public class MibDefinition
{
            /**
             * This member holds the reference to the mapping
             * of system OIDs to supported MIBS.
             */
        private Hashtable m__MapSysOidToMib = new Hashtable();
        /**
        * This member holds the instance of this class.
        */
        private static MibDefinition -instance = null;
        /**
        * This is the default constructor of this class
        */
        private MibDefinitiono (I
        /**
        *This method returns the -instance pointer
        * of this class.
        */
        public static MibDefinition Instance()
{
        if (_instance ++ null)
        {
        _instance = new MibDefinition();
        }
        return __instance;
}
        /**
        * This method is used by the grammar code to set the
        * m__MapSysOidToMib member *after the grammar parses in
        * the MIB definition file
        */
        public void setMapSysOidToMib(Hashtable mapSysOidToMib)
        {
            this.m-MapSysOidToMib = mapSysOidToMib;
        }
        /**
        *   This method returns a reference to the vector
        *   containing the mapping between system OIDs and
        *   MIB variables.
        */
        public Vector getMibBySysOid(String systemoid)
        {
        return (Vector)@MapSysOidToMib.get(systemoid);
        }
        /*
        *   This method returns the default MibDefinitionEntry
        *   object found using the searchstring. The search string must
        *   be an OID or an OID name defined in the
            MibDefinitions.cfg file. The "by"
        * argument is set to define whether the search is by OID
        or OID name.
        */
        public MibDefinitionEntry getMibEntry(String searchstring, int by)
{
        return this.getMibEntry(AnyString, searchstring, by);
}
        /**
        * This method returns the sysObjectID MibDefinifionEntry object
        * found using the searchstring. The search string must be an OID
        * or an OID name defined in the MibDefinitions.cfg file. The "by"
        * argument is set to define whether the search is by OID
        or OID name.
        */
```

-continued

```
public MibDefinitionEntry getMibEntry(String systemoid,
String searchstring, int by)
{
    Vector mibdefentry = this.getMibBySysOid(systemOid);
    if (mibdefentry ! = null)
    {
    for (Enur4eration e = mibdefentry.elementso; e.hasMoreElementso;
    {
      mibDefinitionEntry mde = (MibDefinitionEntry)e.nextElemento;
      String compareString =
          (by == BY-OID-NAME) ? mde.getname()  mde.getoid();
      if (searchString.compareTo(compareString)   == 0)
      {
          return mde;
      }
    return (MibDefinitionEntry)null;
}
/**
* This method returns the OID name as a String given the OID
*/
public String getMibOidName(String systemoid, String oid)
{
    MibDefinitionEntry mde = getMibEntry(systemOid, oid,
    BY-OID);
    if (mde != null)
    {
        return mde.getnameo;
    }
    return null;
}
/**
* This method returns the OID as a String given the OID name
*/
public String getMibOid(String systemoid, String name)
{
    MibDefinitionEntry mde = getMibEntry(systemOid, name,
    BY-OID-NAME);
    if (mde != null)
    {
        return mde.getOid();
    }
    return null;
}
``` private final static String AnyString="Any";
public final static int BY__OID=0;
public final static int BY__OID-NAME=1;

The abstracting the MIB data out of the application and providing a human readable text file is very advantageous.

While specific embodiments of the invention have been shown and described in detail to illustrate the application of the principles of the invention, it will be understood that the invention may be embodied otherwise without departing from such principles.

What is claimed is:

1. A computer network system, comprising:
  network devices with agents comprised of software running on an embedded device microprocessor, the parameters that an agent can control being described in a management information base (MIB), the network devices having a system object identifier (OID);
  network management station (NMS) software monitoring and configuring the network devices; and
  a management information base (MIB) attribute discriminator for organizing MIB attributes, the discriminator including
    a MIB definition listing comprising a listing of device agent attributes organized by system OID,
    a parser for parsing the MIB definitions, said parser being implemented using the Java programming language and is stored as a package within a source code control system wherein the package utilizes the SUN "JJ" language syntax to describe a grammar and the package uses the SUN Java Compiler Compiler (JavaCC) kit to generate a Java parsing source used to parse the definition listing, and a MIB class stored in memory by the parser, the parser generating a set of MIB objects contained within the MIB class.

2. The system according to claim 1, further comprising a MIB definitions interface for accessing MIB data form said MIB class.

3. The system according to claim 1, wherein said MIB definition listing includes device agent attributes organized by software revision.

4. The system according to claim 1, wherein said MIB definition listing includes system object identification information, network entity identification information, software system trap definitions, specific system traps, specific device traps, simple network management protocol (SNMP) traps, virtual LAN information, bridge tables information, Bridge port information, Ethernet pot table information, web parameters, SNMP parameters, stap parameters.

5. The system according to claim 1, wherein said MIB definition listing includes system object identification information and system level parameters.

6. The system according to claim 1, wherein said parser is a class for parsing the MIB definition listing and storing in memory data such that it is readily accessible.

7. The system according to claim 6, further comprising a MIB definitions interface for receiving a string representation of the attribute desired as arguments, looking up MIB objects contained within the MIB class and providing information.

8. The system according to claim 1, wherein said MIB definition listing includes tokens and attributes.

9. The system according to claim 1, wherein said MIB definition listing includes a literal string.

10. A management information base (MIB) attribute discriminator process for organizing MIB attributes for system network management station (NMS) software which NMS software monitors and configures network devices having a system object identifier, the devices having agents comprised of software running on an embedded device microprocessor wherein the parameters that an agent can control are described in a management information base (MIB), the process comprising the steps of:

providing a MIB definition text file, the entries in the text file being described by grammar and tokens;

parsing the MIB definition file with an information parser class and storing MIB data in memory described by grammar and tokens, said parser class being implemented using the Java programming language and being stored as a package within a source code control system wherein the package utilizes the SUN "JJ" language syntax to describe a grammar and the package uses the SUN Java Compiler Compiler (JavaCC) kit to generate a Java parsing source used to parse the definition file;

accessing the MIB data through a MIB definitions interface and using the MIB data with software of the NMS.

11. A computer network system, comprising:

network devices with agents comprised of software running on an embedded device microprocessor, the parameters that an agent can control being described in a management information base (MIB), the network devices having a system object identifier (OID);

network management station (NMS) software monitoring and configuring the network devices; and a management information base (MIB) attribute discriminator for organizing MIB attributes, the discriminator including a MIB definition listing comprising a listing of device agent attributes organized by system OID, said MIB definition listing including system object identification information, network entity identification information, software system trap definitions, specific system traps, specific device traps, simple network management protocol (SNMP) traps, virtual LAN information, bridge tables information, Bridge port information, Ethernet pot table information, web parameters, SNMP parameters, stap parameters, a parser for parsing the MIB definitions, and a MIB class stored in memory by the parser, the parser generating a set of MIB objects contained within the MIB class.

* * * * *